United States Patent Office 2,845,453
Patented July 29, 1958

---

2,845,453

OXIDATION OF ETHYLENE BISDITHIO-CARBAMATES

Lester A. Brooks, Norwalk, Conn., assignor to R. T. Vanderbilt Company, Inc., New York, N. Y., a corporation of New York No Drawing. Application October 27, 1953
Serial No. 388,661

2 Claims. (Cl. 260—500)

My invention relates to a new composition of matter which is useful as a fungicide and to a method for the preparation thereof.

It is well known in the art that disodium ethylene bisdithiocarbamate and other ethylene bisdithiocarbamic acid salts such as the manganese salt possess fungicidal activity. In accordance with my present invention, I have been able to prepare from disodium ethylene bisdithiocarbamate and other water soluble salts of ethylene bisdithiocarbamic acid a new composition of matter having an exceptional degree of fungicidal activity. My new composition is useful for a wide variety of purposes in the agricultural field, including the protecting of potatoes against early and late blight, beans against rust and cucumbers against mildew. The new composition is a mixture of compounds of the formula:

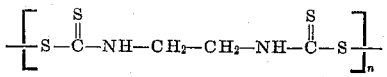

wherein n is an integer of at least 1. The composition is prepared by oxidizing in aqueous solution a water-soluble salt of ethylene bisdithiocarbamic acid with a water-soluble persulfate at a temperature below about 75° C.

As a specific illustration of the preparation of a composition falling within the scope of my invention, in a twenty-five gallon stainless steel tank, fitted with an agitator and cooling coil, there is placed 45 pounds of a 19 percent by weight solution of disodium ethylene bisdithiocarbamate in 15 gallons of cold water. In a separate container there is placed 8 pounds of ammonium persulfate (representing a 5 percent excess over the amount theoretically required) and 5 gallons of water is added an stirred until a thick slurry is obtained. The solution-slurry of ammonium persulfate in the water is added slowly to the aqueous solution of disodium ethylene bisdithiocarbamate with agitation and with cooling. The temperature is not allowed to rise above 60° C. The product precipitates in almost quantitative yield as a fine white powder, which is then filtered, washed and dried. A small sample of the dried material shows it to soften at 95° C. and decompose with the evolution of a gas at 100–105° C. The dry product is a mixture of compounds having the composition given above.

Various modifications can be made in the specific procedure just described to provide other embodiments which fall within the scope of my invention. Thus, in place of the disodium ethylene bisdithiocarbamate used, there can be substituted an equivalent amount of other water-soluble salts of ethylene bisdithiocarbamic acid, particularly the alkali metal salts such as the potassium salt.

Also, in place of the ammonium persulfate used there can be substituted other water-soluble persulfates, particularly the alkali metal persulfates, such as sodium persulfate and potassium persulfate. The relative amounts of bisdithiocarbamate and persulfate employed as reactants is not critical, but in order to insure complete conversion of the bisdithiocarbamate without excessive waste of the persulfate, I prefer to use from 1 to 1.25 moles of persulfate per mole of bisdithiocarbamate. The amount of water used as a solvent for the reactants can also be varied widely, but with some effect upon the type of product produced, as those skilled in the art will understand from the type of reaction involved. In general, however, the weight of water used will be from about 15 to about 30 times the weight of the bisdithiocarbamate employed as a reactant. When the oxidation of the bisdithiocarbamate is carried out using the persulfate, the reaction temperature should not be permitted to rise above about 75° C. and should preferably be kept in the range from about 25° C. to 60° C.

The composition of my invention can be utilized in accordance with procedures which are well understood in the art. Thus, a wettable powder can be prepared using the following ingredients in the following percentages by weight: composition prepared as described in the specific illustration, 75 percent; McNamee clay, 17 percent; Silene EF (a proprietary mineral pigment consisting of a soft, highly absorptive, white, finely divided, precipitated, hydrated calcium silicate), 5 percent; Darvan No. 1 (a proprietary product, being the sodium salt of polymerized polyaryl sulfonic acids), 2 percent; and Ultrawet K (a proprietary aromatic monosodium sulfonate surface active agent), 1 percent. This wettable powder is used as a spray mixed with water at one or two pounds per 100 gallons to apply to the fruit and foliage of plants for the control of diseases such as early blight and late blight of potatoes, apple scab, mildew of cucumbers, rust of beans, anthracnose of tomatoes and the like.

The composition of my invention can also be used in the form of a dust. Thus, the composition prepared as described in the specific illustration can be mixed with clay or talc to provide 5 percent by weight of active ingredients and this mixture applied as a dust to plants can control diseases as described in the preceding paragraph.

My composition can also be used as a seed treating chemical. For example, corn seed can be mixed with the composition prepared in the specific illustration in the amount of from 2 to 4 ounches per bushel to coat the seed thoroughly with the dry powder. For the same purpose, the composition can be mixed with water to form a slurry and the slurry mixed with the seed using from 2 to 4 ounces of the composition, 6 ounces of water and one bushel of seed.

My composition can also be mixed with water or a dry diluent and applied to the soil in order to control such diseases as onion smut, damping off and the like. My composition can also be used in admixture with zinc oxide in a weight ratio of, for example, about 2.5 to 1.

I claim:

1. A composition of matter suitable for use as a fungicide, said composition being prepared by oxidizing in aqueous solution a water-soluble salt of ethylene bisdithiocarbamic acid with a water-soluble persulphate selected from the group consisting of ammonium and alkali metal persulphates at a temperature below about 75° C. until precipitation of said composition occurs.

2. A composition of matter suitable for use as a fungicide, said composition being prepared by oxidizing in aqueous solution the sodium salt of ethylene bisdithiocarbamic acid with ammonium persulphate in a molar ratio of 1 to 1.25 moles of persulphate per mole of bisdithiocarbamate at a temperature of about 25 to about 60° C. until precipitation of said composition occurs.

References Cited in the file of this patent

UNITED STATES PATENTS

| | | |
|---|---|---|
| 2,014,353 | Cramer | Sept. 10, 1935 |
| 2,504,404 | Flenner | Apr. 18, 1950 |
| 2,766,274 | Flenner | Oct. 9, 1956 |

FOREIGN PATENTS

| | | |
|---|---|---|
| 395,726 | Great Britain | July 21, 1933 |